Oct. 17, 1961 C. A. RIGSBY, SR Re. 25,054

STORAGE BATTERY TERMINAL LUG CONNECTOR

Original Filed Sept. 19, 1957 2 Sheets-Sheet 1

INVENTOR

Canby A. Rigsby, Sr.

BY Lowry & Rinehart

ATTORNEYS

Oct. 17, 1961 C. A. RIGSBY, SR Re. 25,054

STORAGE BATTERY TERMINAL LUG CONNECTOR

Original Filed Sept. 19, 1957 2 Sheets-Sheet 2

INVENTOR

Canby A. Rigsby, Sr.

BY Lowry & Rinehart

ATTORNEYS

United States Patent Office

Re. 25,054
Reissued Oct. 17, 1961

25,054
STORAGE BATTERY TERMINAL LUG CONNECTOR

Canby A. Rigsby, Sr., R.R. 2, Elwood, Ind.

Original No. 2,906,804, dated Sept. 29, 1959, Ser. No. 684,913, Sept. 19, 1957. Application for reissue May 23, 1960, Ser. No. 31,245
10 Claims. (Cl. 136—134)

Matter enclosed in heavy brackets [ ] appears in the original patent but forms no part of this reissue specification; matter printed in italics indicates the additions made by reissue.

This invention relates to a new and improved plural cell storage battery having novel inter-cell connnecting means within the battery casing.

Prior constructions of this general form have embodied inter-cell connectors extending through openings in the battery casing partitions and welded or "burned" to plate straps in the cells, and bushings or other yieldable sealing means to prevent leakage through said openings. The present invention, however, has been designed to provide an improved and simplified construction which requires no welding or "burning" and no yieldable sealing means.

In the present invention, plate connecting straps at opposite sides of each partition are provided with terminal lugs contacting with said partition, the lugs and partition have registering openings forming a bore therethrough, and a soft metal pin extends through this bore and has heads at its ends tightly engaging the lugs, said pin being expanded into light contact with the bore wall to not only establish a good electrical connection but to prevent leakage between said pin and said bore wall.

Another object has been to provide the above mentioned bore with circumferential enlargements between its ends and to provide the aforesaid soft metal pin with integral circumferential sealing ribs tightly received in said enlargements and further safeguarding against leakage through the partition opening.

A further object has been to provide a novel method for connecting the terminal lugs with each other and with the partition.

With the above and other objects in view that will become apparaent as the nature of the invention is better understood, the same consists in the novel form, combination and arrangement of parts hereinafter more fully described, shown in the accompanying drawings, and claimed.

Figure 1:
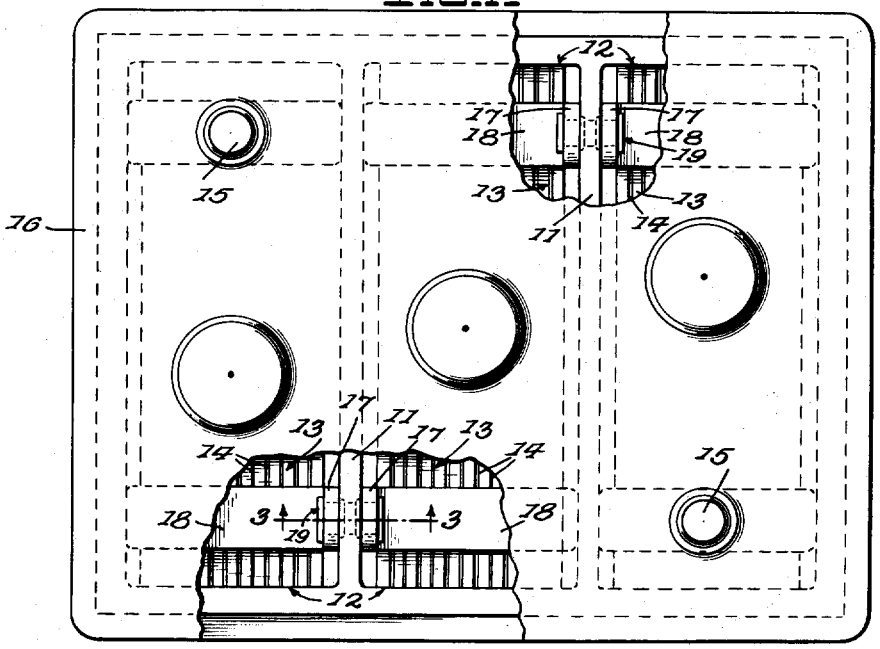
FIG. 1 is a top view, partly broken away, showing a battery embodying one form of the improved construction.
Figure 2:
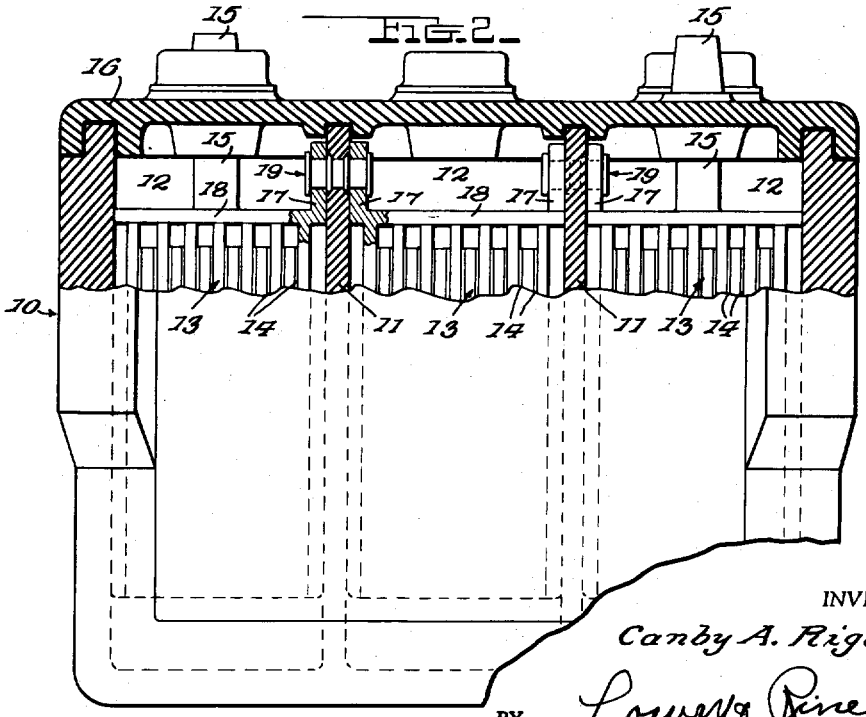
FIG. 2 is a side elevation partly broken away and in section.
Figures 3, 4, 5:
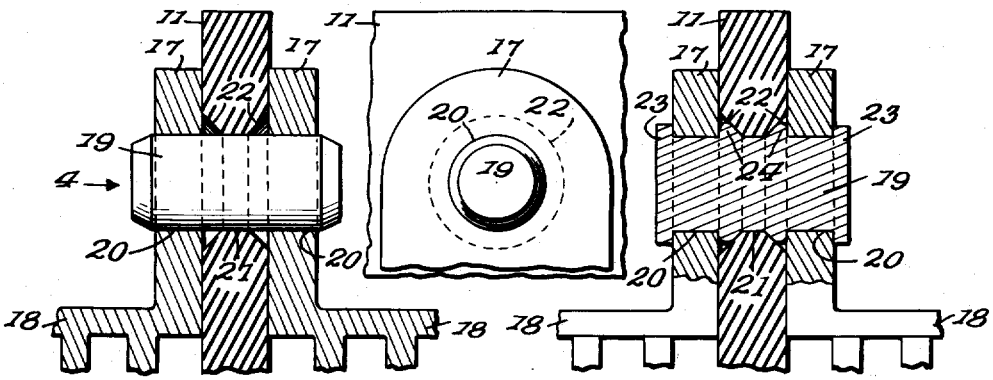
FIG. 3 is an enlarged detail vertical section on line 3—3 of FIG. 1 showing one form of the lug and partition connecting means prior to expansion of the pin.
FIG. 4 is a fragmentary elevation as indicated by the arrow 4 of FIG. 3.
FIG. 5 is a view similar to FIG. 3 but showing the completed connecting means.
Figures 6, 7, 8:
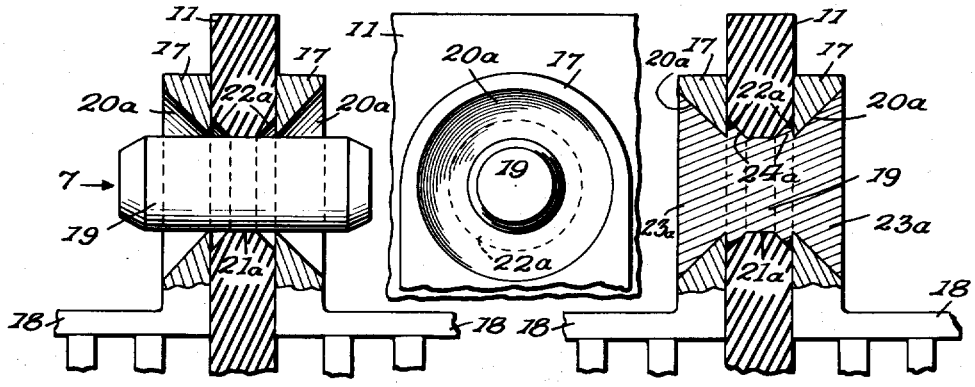
Figures 9, 10, 11:
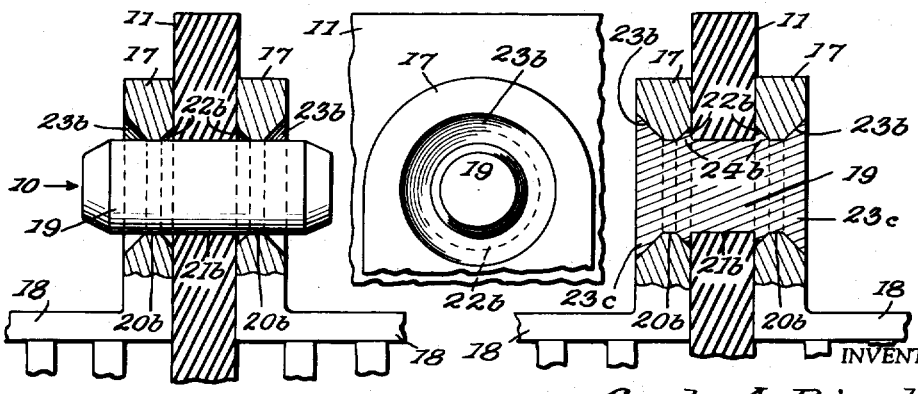

FIGS. 6, 7 and 8 are views corresponding to FIGS. 3, 4 and 5 but showing a second form of construction; and FIGS. 9, 10 and 11 are similar views showing a third form of construction.

The battery casing 10 and its partitions 11 are of conventional insulating material, and said partitions divide said casing into separate cells 12 as usual. Each of these cells contains customary battery elements consisting of an electrolyte, plate groups 13 and separators 14.

The plate groups 13 in the end cells of the casing 10 have conventional terminal posts 15 extending through the casing top 16; and the plate groups in all of the cells have terminal lugs 17 rising from and formed integrally with plate-connecting straps 18. The lugs 17 at opposite sides of each partition 11 are secured tightly against said partition and are electrically connected by means of a soft metal pin 19. Sheet 2 of the drawings illustrates a number of ways in which the pin 19 may be associated with the partition 11 and lugs 17; and reference is now made to the views on said sheet.

In the form of construction shown in FIGS. 3 to 5, the lugs 17 have openings 20 aligned with an opening 21 in the partition 11; and these three openings jointly form a bore which receives the pin 19. The ends of the partition opening 21 are flared at 22, thus providing the bore 20, 21 with two circumferential enlargements. The soft metal pin 19 is inserted through the bore 20, 21 and is initially of such length that its ends project beyond the lugs 17, as seen in FIG. 3. Then the pin 19 is longitudinally compressed and thus formed with heads 23 which tightly abut the lugs 17. The longitudinal compression of the pin 19 expands it into extremely tight contact with the wall of the bore 20, 21 and causes some of the pin metal to flow into the bore enlargements 22, thereby providing said pin with circumferential sealing ribs 24 tightly seated in said bore enlargements 22.

The above described operations result in a simple structure in which an excellent electrical connection exists between the lugs 17 and in which there is no danger of electrolyte leakage around the pin 19 from cell to cell. The pin is preferably formed from battery lead alloy and is well adapted to expand and flow as desired when longitudinally compressed.

In the construction shown in FIGS. 6 to 8, the openings 20a of the lugs 17 are outwardly flared and the ends of the partition opening 21a are flared at 22a to increase the bore diameter. When the pin 19 is longitudinally compressed, the heads 23a are formed and tightly fill the openings 20a, and sealing ribs 24a are formed and tightly seated in the bore enlargements 22a.

In the form of construction shown in FIGS. 9 to 11, the ends of the partition opening 21b are not flared. The inner ends of the lug openings 20b, however, are flared at 22b to increase the bore diameter, and the outer ends of said openings 20b are flared at 23b. When the pin 19 is longitudinally compressed, it is provided with heads 23c tightly seated in the flared outer ends 23b of the lug openings 20b, and with sealing ribs 24b tightly seated in the bore enlargements 22b.

It will be seen from the foregoing that novel and advantageous provision has been disclosed for attaining the desired ends. However, attention is invited to the possibility of making variations within the scope of the invention as claimed.

*For example, it will be evident that the expansion of the pin can broadly be referred to as deforming thereof and that the simple expansion of the pin is effective for creating a seal in the bore wall as will be noted from FIGURE 9 wherein there are no enlargements of the bore extending through the partition wall. Similarly, the deformation or expansion of the pin in the lugs 17 will effect good electrical contact therewith even in the absence of heads on the ends of the pin. Still further, the deformation of the pin into lateral pressure engagement with the lugs 17 will at the same time draw the lugs 17 into firm engagement with opposite faces of the wall thus enhancing the sealing between the cells on opposite sides of the partition wall.*

*Breakage could also be inhibited by the provision of resilient means between the pin and the partition wall.*

*It will be further evident that some breakage of the partition walls may occur in the forming of the bores therein and it is contemplated that such breakage will be repaired before the pins are insterted and deformed.*

*Such modifications are intended to be included within the purview of the present invention and the scope of the appended claims.*

I claim:

1. In a storage battery, an insulating casing having an insulating partition dividing it into cells, groups of plates in said cells and having terminal lugs contacting with opposite sides of said partition respectively, said lugs and partition having communicating openings jointly forming a bore therethrough, and a soft metal conducting pin separate from said lugs and extending through said bore, said pin being compressed into intimate and full sealing contact with the wall of the partition bore and the lugs, said pin having enlarged cross-sectional areas intermediate its ends adjacent each side of the partition and at both of its ends whereby each terminal lug is in electrical contact with a plurality of enlarged areas of the pin [and each pin serving as the only sealing medium between adjacent cells].

2. A structure as specified in claim 1, in which said bore has circumferential enlargements between its ends, and in which said pin has integral circumferential sealing ribs tightly received in said bore enlargement.

3. A structure as specified in claim 1, in which said bore has two circumferential enlargements located where the partition opening communicates with the lug openings, and in which said pin has two integral circumferential sealing ribs tightly received in said enlargements respectively.

4. A structure as specified in claim 1, in which said bore has flared ends and also has circumferential enlargements between its ends, and in which said pin has integral circumferential sealing ribs between its ends, said enlarged pin ends being tightly received in said flared bore ends, said sealing ribs being tightly received in said bore enlargements.

5. A structure as specified in claim 1, in which said bore has flared ends and also has two circumferential enlargements located where the partition opening communicates with the lug openings, and in which said pin has two circumferential sealing ribs between its ends, said enlarged pin ends being tightly received in said enlarged bore ends, said sealing ribs being tightly received in said bore enlargements.

6. A structure as specified in claim 1, in which the ends of the partition opening are flared to provide said bore with two circumferential enlargements, and in which said pin has two integral circumferential sealing ribs tightly received in said bore enlargements respectively.

7. A structure as specified in claim 1, in which the ends of the partition opening are flared to provide said bore with two circumferential enlargements, and in which said pin has two integral circumferential sealing ribs tightly received in said bore enlargements respectively, the ends of said bore being conically flared, said enlarged pin ends being tightly received in said flared bore ends.

8. A structure as specified in claim 1, in which the inner ends of the lug openings are flared to provide said bore with circumferential enlargements, and in which said pin has integral circumferential sealing ribs tightly received in said bore enlargements.

9. A structure as specified in claim 1, in which the inner ends of the lug openings are flared to provide said bore with circumferential enlargements, and in which said pin has integral circumferential sealing ribs tightly received in said bore enlargements, the ends of said bore being conically flared, said enlarged pin ends being tightly received in said enlarged bore ends.

*10. In a storage battery, an insulating casing having an insulating partition dividing it into cells, groups of plates in said cells and having terminal lugs contacting with opposite sides of said partition respectively, said lugs and partition having communicating openings jointly forming a bore therethrough, and a soft metal conducting pin separate from said lugs and extending through said bore, said pin being compressed into intimate and full sealing contact with the wall of said bore and with said lugs, said pin having enlarged cross-sectional areas intermediate its ends adjacent each side of the partition and at both of its ends whereby each terminal lug is in electrical contact with a plurality of enlarged areas of the pin.*

References Cited in the file of this patent or the original patent

UNITED STATES PATENTS

| | | |
|---|---|---|
| 1,758,506 | Ford | May 13, 1930 |
| 1,828,393 | Chilton | Oct. 20, 1931 |
| 1,966,401 | Andren | July 10, 1934 |
| 2,221,542 | Hopkins | Nov. 12, 1940 |
| 2,228,779 | Pavlecka et al. | Jan. 14, 1941 |
| 2,375,116 | Larkin | May 1, 1945 |
| 2,603,671 | Burns et al. | July 15, 1952 |
| 2,775,018 | McLaughlin | Dec. 25, 1956 |
| 2,847,622 | Bugel | Aug. 12, 1958 |